US010282698B2

(12) United States Patent
Camp (10) Patent No.: US 10,282,698 B2
(45) Date of Patent: May 7, 2019

(54) SMART SHELVES

(71) Applicant: EBAY INC., San Jose, CA (US)

(72) Inventor: Roy L. Camp, Cupertino, CA (US)

(73) Assignee: EBAY INC., San Jose, CA (US)

( * ) Notice: Subject to any disclaimer, the term of this patent is extended or adjusted under 35 U.S.C. 154(b) by 1025 days.

(21) Appl. No.: 14/585,337

(22) Filed: Dec. 30, 2014

(65) Prior Publication Data
US 2016/0187189 A1    Jun. 30, 2016

(51) Int. Cl.
| | | |
|---|---|---|
| G06Q 30/00 | (2012.01) | |
| G06Q 10/08 | (2012.01) | |
| G01G 19/414 | (2006.01) | |
| A47F 5/00 | (2006.01) | |
| A47F 10/02 | (2006.01) | |
| G06Q 30/06 | (2012.01) | |
| G06Q 20/20 | (2012.01) | |
| G01G 19/42 | (2006.01) | |

(52) U.S. Cl.
CPC ......... *G06Q 10/087* (2013.01); *A47F 5/0043* (2013.01); *A47F 10/02* (2013.01); *G01G 19/4144* (2013.01); *G01G 19/42* (2013.01); *G06Q 20/208* (2013.01); *G06Q 30/0641* (2013.01); *A47F 2010/025* (2013.01)

(58) Field of Classification Search
None
See application file for complete search history.

(56) References Cited

U.S. PATENT DOCUMENTS

| | | | | |
|---|---|---|---|---|
| 2008/0052198 A1* | 2/2008 | Hosokawa | ........... | G06Q 10/087 705/28 |
| 2012/0239504 A1* | 9/2012 | Curlander | .............. | G06Q 30/02 705/14.66 |
| 2013/0092456 A1* | 4/2013 | Laird | ..................... | G01G 19/00 177/1 |
| 2014/0201041 A1* | 7/2014 | Meyer | ................. | G06Q 10/087 705/28 |
| 2016/0042432 A1* | 2/2016 | Wenig | ................ | G06O 30/0631 705/26.7 |

OTHER PUBLICATIONS

Metzger, Christian, Indirect Object-Sensing Technology to Prevent Out-of-Stock at Retail-level, 2005, Proceedings of the Workshop on Smart Object at the International Conference on Ubiquitous Computing (Year: 2005).*

* cited by examiner

*Primary Examiner* — William J Allen
*Assistant Examiner* — Timothy J Kang
(74) *Attorney, Agent, or Firm* — Maschoff Brennan (57) ABSTRACT

A method may include obtaining a weight of merchandise supported by a shelf and obtaining identifier data of the merchandise supported by the shelf. The identifier data may be wirelessly received from tags associated with the merchandise. The method may also include determining information for presentation to a consumer regarding the merchandise based on the weight of the merchandise and the identifier data of the merchandise. The method may also include providing the information for presentation to the consumer of the merchandise when the consumer is proximate the merchandise that is supported by the shelf.

19 Claims, 5 Drawing Sheets

SMART SHELVES

FIELD

The embodiments discussed herein are related to smart shelves.

BACKGROUND

Internet commerce has changed many ways that businesses sell products to consumers. That being said, consumers still travel to box stores to purchase a majority of merchandise. In box stores, the merchandise is typically displayed on a shelf with a price. The prices are usually printed on a piece of paper that is updated based on sales or overall changes in prices. Changing prices printed on pieces of paper in box stores may be cumbersome and inefficient.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein may describe a system to provide merchandise information to a consumer. In these and other embodiments, the system may include a shelf configured to support merchandise and a weight measurement device coupled to the shelf. The weight measurement device may be configured to measure a weight of the merchandise supported by the shelf. The system may also include an electromagnetic field reader coupled to the shelf. The electromagnetic field reader may be configured to wirelessly receive identifier data of the merchandise supported by the shelf from tags coupled to the merchandise. The system may also include a display configured to present information to a consumer regarding the merchandise and a computing system communicatively coupled to the display, the weight measurement device, and the electromagnetic field reader. The computing system may be configured to determine the information to be presented to the consumer based on the weight of the merchandise and the identifier data of the merchandise.

Some embodiments described herein may describe a method to provide merchandise information to a consumer. In these and other embodiments, the method may include obtaining a weight of merchandise supported by a shelf and obtaining identifier data of the merchandise supported by the shelf. The identifier data may be wirelessly received from tags associated with the merchandise. The method may also include determining information for presentation to a consumer regarding the merchandise based on the weight of the merchandise and the identifier data of the merchandise. The method may also include providing the information for presentation to the consumer of the merchandise when the consumer is proximate the merchandise that is supported by the shelf.

Some embodiments described herein may describe a method to provide merchandise information to a consumer. In these and other embodiments, the method may include obtaining a weight of merchandise supported by a shelf in a store and obtaining identifier data of the merchandise supported by the shelf. In these and other embodiments, the identifier data may be wirelessly received from tags associated with the merchandise. The method may also include determining an inventory of the merchandise supported by the shelf based on the weight and the identifier data.

Figure 1:
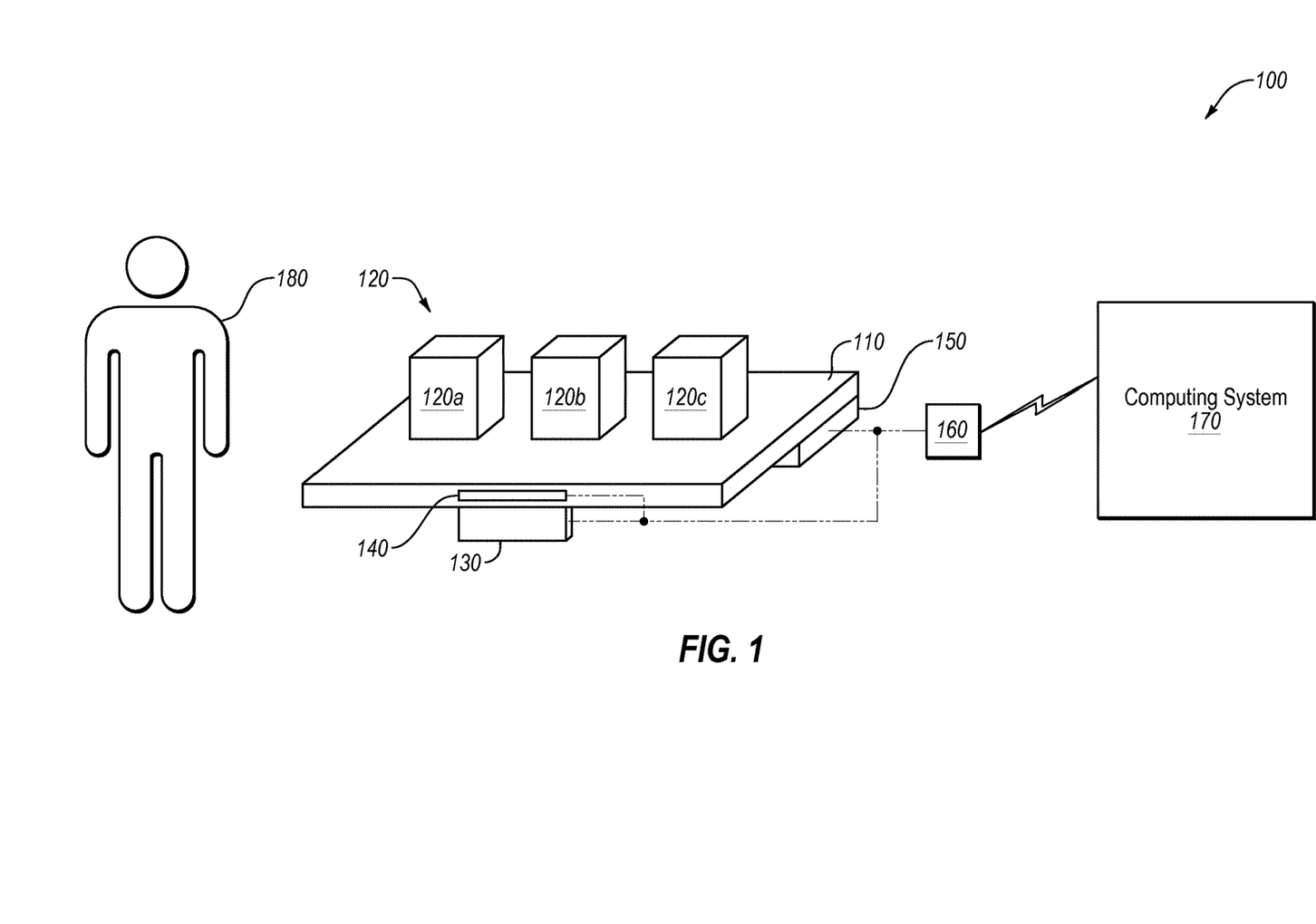
FIG. 1 illustrates an example system to provide merchandise information to a consumer.

Turning to the figures, FIG. 1 illustrates an example system 100 to provide merchandise information to a consumer. The system 100 may be arranged in accordance with at least one embodiment described herein. The system 100 may include a shelf 110, a display 130, an electromagnetic field reader 140, a weight measurement device 150, a communication interface 160, and a computing system 170.

In general, the system 100 may be configured to present information about merchandise 120 supported by the shelf 110 to a consumer 180 that is proximate to the shelf 110. The information presented to the consumer 180 may be information about the merchandise 120 that is relevant to the consumer 180, a price of the merchandise 120, or other information about merchandise 120.

In general, the shelf 110 may be any type of structure that is configured to support merchandise 120. As illustrated, the shelf 110 is a flat structure upon which the merchandise 120 rests. In some embodiments, the shelf 110 may be a rack type structure from which the merchandise 120 hangs or that supports articles attached to the merchandise 120. In some embodiments, the shelf 110 may be a solid surface or a framework of bars, slats, or other configuration of material that is configured to support the merchandise 120. The shelf 110 may be manufactured from multiple different types of material, such as wood, plastic, metal, or some combination thereof.

The merchandise 120 may be any type of good or product. For example, the merchandise 120 may be food, electronics, cosmetics, clothing, and household items, among other types of goods or products. FIG. 1 illustrates three pieces of the merchandise 120. A first merchandise 120a, a second merchandise 120b, and a third merchandise 120c. Collectively the first merchandise 120a, the second merchandise 120b, and the third merchandise 120c may be referred to herein as the merchandise 120. In some embodiments, the first merchandise 120a, the second merchandise 120b, and the third merchandise 120c may be the same type of product or good. Alternately or additionally, the first merchandise 120a, the second merchandise 120b, and the third merchandise 120c may each be different types of products or goods or some may be the same type and others may be different types.

The display 130 may be configured to present information about the merchandise 120 to the consumer 180. In some embodiments, the display 130 may be an electronic type display such as a light emitting diode (LED), organic LED (OLED), a liquid-crystal display (LCD), plasma, or some other type of electronic type display. In some embodiments, the display 130 may also include a speaker to present the information about the merchandise 120 to the consumer 180 in audio.

In some embodiments, the display 130 may receive the information to present to the consumer 180 from the communication interface 160. In these and other embodiments, the communication interface 160 may receive the information from the computing system 170. In some embodiments, the display 130 may receive and present the information in real-time or near real-time. Alternately or additionally, the display 130 may receive the information, store the information, and present the information after a period of time or after receiving a signal to present the information.

In some embodiments, the display 130 may present information about one type of the merchandise 120 and not other types of the merchandise 120 supported by the shelf 110. Alternately or additionally, the display 130 may present information about every type of the merchandise 120 supported by the shelf 110.

In the illustrated embodiment, the display 130 may be coupled to the shelf 110. In these and other embodiments, the display 130 may be coupled to the shelf 110 such that the display 130 may be easily viewed by a consumer 180 and associated with the merchandise 120. In some embodiments, the display 130 may not be coupled to the shelf 110. In these and other embodiments, the display 130 may be positioned such that the display 130 is associated with the merchandise 120 such that the consumer 180 may determine that the display 130 is presenting information about the merchandise 120.

The electromagnetic field reader 140 may be configured to wirelessly communicate with the merchandise 120. In particular, the electromagnetic field reader 140 may be configured to wirelessly receive identifier data of the merchandise 120 supported by the shelf 110. In these and other embodiments, radio tags may be coupled to merchandise 120 that include the identifier data of the merchandise 120. The radio tags may wirelessly transmit the identifier data of the merchandise 120 as an electromagnetic signal to the electromagnetic field reader 140. The radio tags may transmit the electromagnetic signal to the electromagnetic field reader 140 at the request of the electromagnetic field reader 140, at a particular time interval, at random time intervals, or based on some other criteria.

The electromagnetic field reader 140 may receive the identifier data from the radio tags of the merchandise 120. In some embodiments, the electromagnetic field reader 140 may demodulate and convert the electromagnetic signal to an electrical signal and send the electrical signal over a wired network to the communication interface 160. In some embodiments, the electromagnetic field reader 140 may demodulate the electromagnetic signal from the radio tags to obtain the identifier data and then wirelessly transmit the identifier data to the communication interface 160.

In some embodiments, the electromagnetic field reader 140 may be coupled to the shelf 110. In these and other embodiments, the electromagnetic field reader 140 may be coupled to a bottom of the shelf 110, a side of the shelf 110, a back of the shelf 110, or some other part of the shelf 110. In some embodiments, the electromagnetic field reader 140 may be coupled to another structure but in proximity to the merchandise 120 to receive electromagnetic signals transmitted from radio tags coupled to the merchandise 120.

The identifier data of the merchandise 120 may include various information about the merchandise 120. For example, the identifier data of the merchandise 120 may include a UPN number, product ID, catalog number, or some other identifier of the merchandise 120. In some embodiments, the identifier data of the merchandise 120 may include additional information about the merchandise 120. For example, the identifier data of the merchandise 120 may include information such as a description of the merchandise 120 and instructions for care about the merchandise 120, among other information about the merchandise 120.

The weight measurement device 150 may be coupled to the shelf 110. The weight measurement device 150 may be configured to measure a weight of the merchandise 120 supported by the shelf 110. The weight measurement device 150 may provide the measured weight of the merchandise 120 to the communication interface 160 over a wired or wireless communication interface. In some embodiments, the weight measurement device 150 may send the measured weight of the merchandise 120 at a particular time interval, at random time intervals, based on changes to the measured weight, or based on some other criteria.

The communication interface 160 may be configured to relay information between the display 130, the electromagnetic field reader 140, the weight measurement device 150, and the computing system 170. In these and other embodiments, the communication interface 160 may communicate with the display 130, the electromagnetic field reader 140, and the weight measurement device 150 over a wired interface and communicate with the computing system 170 over a wireless interface.

In some embodiments, the communication interface 160 may relay information between multiple other displays, electromagnetic field readers, and weight measurement devices and the computing system 170. In some embodiments, the system 100 may not include the communication interface 160. In these and other embodiments, the display 130, electromagnetic field reader 140, and weight measurement device 150 may communicate directly with the computing system 170 over a wired or wireless interface.

The computing system 170 may receive the identifier data of the merchandise 120 and the measured weight of the merchandise 120 from the electromagnetic field reader 140 and weight measurement device 150, respectively. Using the received identifier data and the received measured weight, the computing system 170 may be configured to determine the information to be presented to the consumer 180 by the display 130.

For example, using the received identifier data and the received measured weight, the computing system 170 may determine the type of the merchandise 120 supported by the shelf 110. After determining the type of the merchandise 120, the computing system 170 may determine the information to be presented by the display 130. The information to be presented to the consumer 180 may include the type of the merchandise 120.

After determining the information, the computing system 170 may communicate the information to the communication interface 160. The communication interface 160 may communicate the information to the display 130. The display 130 may then present the information to the consumer 180.

In some embodiments, the information presented to the consumer 180 may be a price of one of the pieces of the merchandise 120. When the first merchandise 120a, the second merchandise 120b, and third merchandise 120c are different types of merchandise, the information may be a price for each one, or some of the first merchandise 120a, the second merchandise 120b, and the third merchandise 120c. In these and other embodiments, the computing system 170 may determine the price based on price information in a database. Alternatively or additionally, the computing system 170 may be configured to determine the price based on the price information and other factors. For example, the computing system 170 may determine the price based on the price information and a location of the shelf 110 with a store, a time of day, a day of the week, a manufacturer's coupon or rebate for the merchandise 120, how many pieces of the merchandise 120 are supported by the shelf 110, and a competing price of the merchandise 120 at a different location.

Using the system 100, the price of the merchandise 120 may be dynamic and vary based on different factors and information. Previous pricing systems may have used prices that are static or based on employees changing the prices by hand. For example, in other pricing systems an employee may change a price of merchandise by physically changing a tag associated with the merchandise at a shelf that supports the merchandise. Using the above system 100, the price of the merchandise 120 may be changed at the same time as the price of all other merchandise in a store. Furthermore, the price of the merchandise 120 may be changed with reduced effort and costs as compared to previous pricing systems. Additionally or alternatively, the price of merchandise 120 may be determined and displayed based on the weight of the merchandise 120.

In some embodiments, the information determined by the computing system 170 to be presented by the display 130 may include information about the merchandise 120. For example, the information about the merchandise 120 may include details about the manufacture of the merchandise 120, such as ingredients for food, material for clothes, the weight, etc. As another example, the information about the merchandise 120 may include details about a use or advantages of the merchandise 120.

In some embodiments, the computing system 170 may determine an inventory of the merchandise 120 based on the received measured weight and received identifier data. For example, based on the identifier data, the computing system 170 may determine the type of the merchandise 120. Based on the type of the merchandise 120, the computing system 170 may determine a weight of individual pieces of the merchandise 120. Using the received measured weight and the weight of individual pieces of the merchandise 120, the computing system 170 may determine an inventory of the merchandise 120 on the shelf 110.

In some embodiments, the computing system 170 may perform other actions based on the inventory of the merchandise 120. For example, the computing system 170 may order additional merchandise 120 based on the inventory of the merchandise 120 on the shelf 110. Alternately or additionally, the computing system 170 may provide information regarding restock of merchandise 120 on the shelf 110 based on the inventory of the merchandise 120.

In view of this disclosure, it will be appreciated that modifications, additions, or omissions may be made to the system 100 without departing from the scope of the present disclosure. For example, in some embodiments, the system 100 may not include the computing system 170 as a separate component. In these and other embodiments, the computing system 170 may be combined with the display 130.

As another example, FIG. 1 illustrates a single shelf, shelf 110. In some embodiments, the system 100 may include multiple shelves. Each of the shelves may have a corresponding display, electromagnetic field reader, and weight measurement device. In these and other embodiments, the computing system 170 may provide the information for the displays of all of the shelves.

Figure 2:
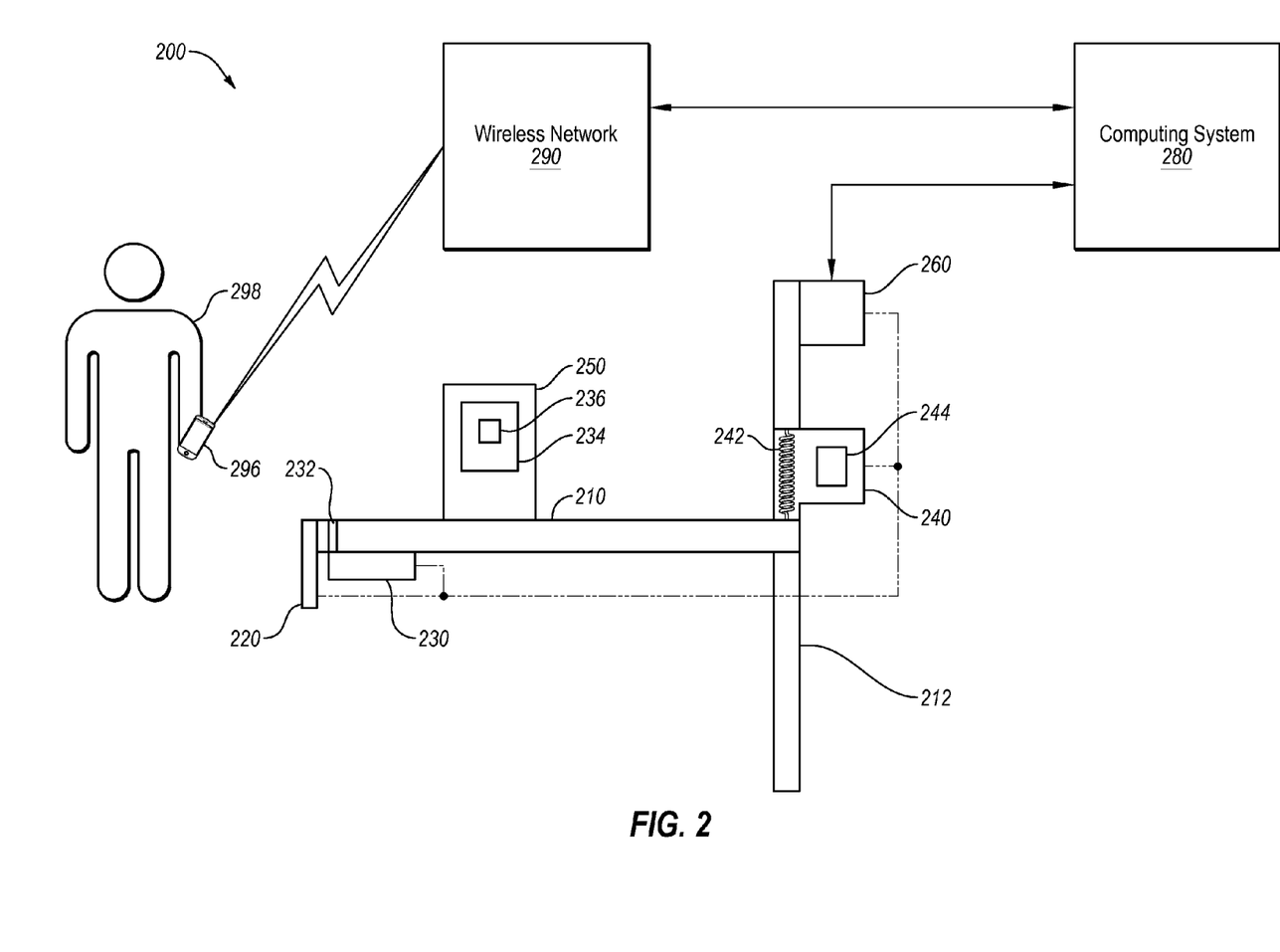
FIG. 2 illustrates another example system to provide merchandise information to a consumer.

FIG. 2 illustrates another example system 200 to provide merchandise information to a consumer. The system 200 may be arranged in accordance with at least one embodiment described herein. The system 200 may include a shelf 210, a support 212, a display 220, an electromagnetic field reader 230, a weight measurement device 240, a communication interface 260, a computing system 280, and a wireless network 290.

In general, the system 200 may be configured to present information about merchandise 250 supported by the shelf 210 to a consumer 298 that is proximate to the shelf 210. The information presented to the consumer 298 may be information about the merchandise 250 that is relevant to the consumer 298, a price of the merchandise 250, or other information about the merchandise 250.

The shelf 210 may be any type of structure that is configured to support the merchandise 250. The shelf 210 may be supported by the support 212.

The display 220 may be coupled to the front of the shelf 210. The display 220 may be configured to present information about the merchandise 250. In some embodiments, the display 220 may be configured to receive information about the merchandise 250 from the computing system 280 by way of the communication interface 260.

The electromagnetic field reader 230 may be coupled toward the front of the shelf 210. The electromagnetic field reader 230 may be configured to wirelessly communicate with a radio tag 234 coupled to the merchandise 250. In particular, the electromagnetic field reader 230 may be configured to communicate with the radio tag 234 to receive identifier data of the merchandise 250 from the radio tag 234.

In some embodiments, the radio tag 234 may be a radio tag 234 that is passive such as, a near field communication tag. In these and other embodiments, the electromagnetic field reader 230 may emit an electromagnetic field from the antenna 232 to a space above and in front of the shelf 210. The electromagnetic field may interact with an antenna 236 that is included in the radio tag 234. The electromagnetic field may generate electricity in the radio tag 234 that may be used to generate a data signal that includes the identifier data and to transmit the data signal from the antenna 236 to the antenna 232 of the electromagnetic field reader 230. The electromagnetic field reader 230 may receive the data signal and extract the identifier data. The electromagnetic field reader 230 may send the identifier data to the computing system 280 by way of the communication interface 260. In some embodiments, the electromagnetic field reader 230 may send an indication of the power envelope of the data signal received by the electromagnetic field reader 230.

The weight measurement device 240 may be coupled to the support 212 and the shelf 210. The weight measurement device 240 may be configured to determine a weight of the merchandise 250 supported by the shelf 210. The weight measurement device 240 may include an elastic device 242 and a position monitor 244. The elastic device 242 may include a spring or some other device that expands and contracts based on an increase or decrease of weight supported by the elastic device 242. The elastic device 242 may be coupled to the shelf 210. In some embodiments, the elastic device 242 may be configured to expand in response to more weight being supported by the shelf 210 and to contract in response to less weight being supported by the shelf 210. The position monitor 244 may be an optical or mechanical device and may be configured to determine a position of the elastic device 242. Based on the position of the elastic device 242, the weight measurement device 240 may determine the weight supported by the shelf 210. The weight measurement device 240 may provide the weight supported by the shelf 210 to the computing system 280 by way of the communication interface 260.

The communication interface 260 may be configured to relay information between the display 220, the electromagnetic field reader 230, the weight measurement device 240, and the computing system 280. In some embodiments, the system 200 may not include the communication interface 260.

The wireless network 290 may be communicatively coupled to the computing system 280. The wireless network 290 may also be communicatively coupled with a wireless device 296 owned by the consumer 298. Through various nodes in the wireless network 290, the wireless network 290 may collect location data of the wireless device 296 that may be used to determine a location of the wireless device 296. The location of the wireless device 296 may be used as a proxy for a location of the consumer 298. The wireless network 290 may be further configured to collect identification data of the consumer 298 from the wireless device 296. The wireless network 290 may provide the identification data and the location data of the consumer 298 to the computing system 280.

The computing system 280 may be communicatively coupled to the display 220, the electromagnetic field reader 230, the weight measurement device 240, the communication interface 260, and the wireless network 290. The computing system 280 may be configured to receive the identification data and the location data of the consumer 298 from the wireless network 290. The computing system 280 may also be configured to receive the identifier data and the weight being supported by the shelf 210.

In some embodiments, the computing system 280 may determine information about the merchandise 250 that may be presented by the display 220 to the consumer 298 based on the identifier data and the weight being supported by the shelf 210. For example, computing system 280 may determine the type of the merchandise 250 supported by the shelf 210 based on the identifier data and the weight being supported by the shelf 210. Based on the type of the merchandise 250 supported by the shelf 210, the computing system 280 may determine the information for display about the merchandise 250.

To determine the type of the merchandise 250 based on the identifier data and the weight being supported by the shelf 210, the computing system 280 may correlate the identifier data with a change in the weight being supported by the shelf 210. For example, when the computing system 280 obtains an indication that the weight supported by the shelf 210 has increased, the computing system 280 may correlate the change in weight to identifier data received in approximately the same time frame as the change in weight. The computing system 280 may use the received identifier data to obtain a weight for the type of the merchandise indicated in the identifier data. The computing system 280 may compare the increase of the weight supported by the shelf 210 with the weight for the type of the merchandise indicated by the identifier data. In response to the increase of the weight and the weight for the type of the merchandise 250 being approximately equal or equal, the computing system 280 may determine the type of the merchandise 250 supported by the shelf 210 is the type of the merchandise as indicated in the identifier data. By correlating the identifier data and the weight, the computing system 280 may avoid incorrectly determining the type of the merchandise 250 supported by the shelf 210 and thereby determining information to be presented on the display 220 that does not relate to the merchandise 250.

In some embodiments, the computing system 280 may use other information from the electromagnetic field reader 230 to determine the type of the merchandise 250 and/or an inventory of the merchandise 250 on the shelf 210. For example, the computing system 280 may correlate the identifier data, the power envelope of the data signal received by the electromagnetic field reader 230 that included the identifier data (referred to herein as the power envelope), and the change in weight to determine the type and/or inventory of the merchandise 250.

In some embodiments, the computing system 280 may use the identifier data, the power envelope, and the change in weight to determine the type of the merchandise 250 and whether the merchandise 250 is being added or removed from the shelf. In these and other embodiments, the antenna 232 of the electromagnetic field reader 230 may be positioned such that the radio signals from the radio tag 234 coupled to the merchandise 250 may have a power envelope that is larger or varies when the merchandise 250 is being removed or added to the shelf 210. For example, the antenna 232 of the electromagnetic field reader 230 may be positioned near or at the edge of shelf 210 to which the display 220 is coupled. Using the power envelope, the computing system 280 may determine the identifier data that comes from the merchandise 250 that is being removed or placed on the shelf 210. For example, for the merchandise 250 that is being removed or placed on the shelf 210, the power envelope may be higher than for the merchandise 250 that is not being removed or placed on the shelf 210 because of the proximity of the antenna 236 to the antenna 232. As another example, for the merchandise 250 that is being removed or placed on the shelf 210, the power envelope may vary as compared to power envelopes for the merchandise 250 not being removed or placed on the shelf 210 because the merchandise 250 not being removed or placed on the shelf 210 may be stationary.

By further correlating the identifier data that is associated with merchandise 250 being removed or placed on the shelf 210 with the change in weight, the computing system 280 may determine how many pieces of the merchandise 250 are placed onto or removed from the shelf 210. Using the determination of how many pieces of the merchandise 250 are placed onto or removed from the shelf 210, the computing system 280 may determine an inventory of merchandise 250. The computing system 280 may also determine the type of the merchandise 250 using the identifier data.

Based on the type and the inventory of the merchandise 250, the computing system 280 may determine information about the merchandise 250 to present on the display 220. For example, information about the merchandise 250 may include a price of the merchandise 250. In these and other embodiments, the computing system 280 may adjust the price of the merchandise 250 based on the inventory of the merchandise 250. For example, when fewer pieces of the merchandise 250 are located on the shelf 210, the computing system 280 may determine to increase the price of the merchandise 250. The computing system 280 may update the price of the merchandise 250 in real time by sending the updated price of the merchandise 250 to the display 220 to present to the consumer 298.

Alternately or additionally, the computing system 280 may adjust a price of the merchandise 250 based on a determination that the consumer 298 lifted the merchandise 250 off of the shelf 210 and then placed the merchandise 250 back onto the shelf 210. For example, when the computing system 280 determines that a piece of the merchandise 250 is removed and then replaced within a particular time period, such as 30 seconds, the computing system 280 may determine that the consumer 298 picked up, looked at, and then replaced the merchandise 250. Based on this behavior of the consumer 298, the computing system 280 may determine that the consumer 298 is interested in the merchandise 250 but does not plan to purchase the merchandise 250 at this time. The computing system 280 may determine to reduce the price of the merchandise 250 to entice the consumer 298 to purchase the merchandise 250 based on the determination that the consumer 298 is interested in the merchandise 250 but does not plan to purchase the merchandise 250. Alternately or additionally, the computing system 280 may provide information to present to the consumer 298 about a coupon, a store rebate, a manufacturer's rebate, or some other promotion that results in a reduced price of the merchandise 250 to entice the consumer 298 to purchase the merchandise 250.

Alternately or additionally, the computing system 280 may take other action with respect to determining the inventory of the merchandise 250. For example, the computing system 280 may determine when to order additional merchandise 250 or to restock the shelf 210 with the merchandise 250 based on the inventory of the merchandise 250.

In some embodiments, the computing system 280 may determine information about the merchandise 250 that may be presented by the display 220 to the consumer 298 based further on the identification data and the location data.

For example, the computing system 280 may be configured to determine a location of the wireless device 296 based on the location data received from the wireless network 290. The computing system 280 may receive the identification data of the consumer 298 from the wireless network 290. Using the location of the wireless device 296, the computing system 280 may assume that the consumer 298 is in the same location. The computing system 280 may be aware of the location of the shelf 210. By comparing the location of the consumer 298 with the location of the shelf 210, the computing system 280 may determine when the consumer 298 is located in proximity of the shelf 210.

The computing system 280 may be further configured to access information about the consumer 298 based on the identification data of the consumer 298. For example, in some embodiments, the identification data of the consumer 298 may be a random number that is associated with information about the consumer 298 in a database. The computing system 280 may access the database to obtain the information about the consumer 298. In some embodiments, the consumer information may include previous purchases by the consumer 298, health conditions of the consumer 298, internet traffic of the consumer 298, goals of the consumer 298, travel plans of the consumer 298, a calendar of the consumer 298, a current planned purchase of the consumer 298, among other information about the consumer 298.

The computing system 280 may analyze the consumer information to determine if the consumer information is related to the merchandise 250 supported by the shelf 210. When the consumer information is related to the merchandise 250, the computing system 280 may determine information about the merchandise 250 that may be presented by the display 220 to the consumer 298 that is customized for the consumer 298. In some embodiments, the information presented to the consumer may include a price of one piece of the merchandise 250 and details regarding the merchandise 250 that is customized for the consumer 298.

In view of this disclosure, it will be appreciated that modifications, additions, or omissions may be made to the system 200 without departing from the scope of the present disclosure. For example, in some embodiments, the display 220, the electromagnetic field reader 230, weight measurement device 240, and the computing system 280 may communicate using the wireless network 290. In some embodiments, the computing system 280 may be distributed among the display 220, the electromagnetic field reader 230, and the weight measurement device 240.

Figure 3:
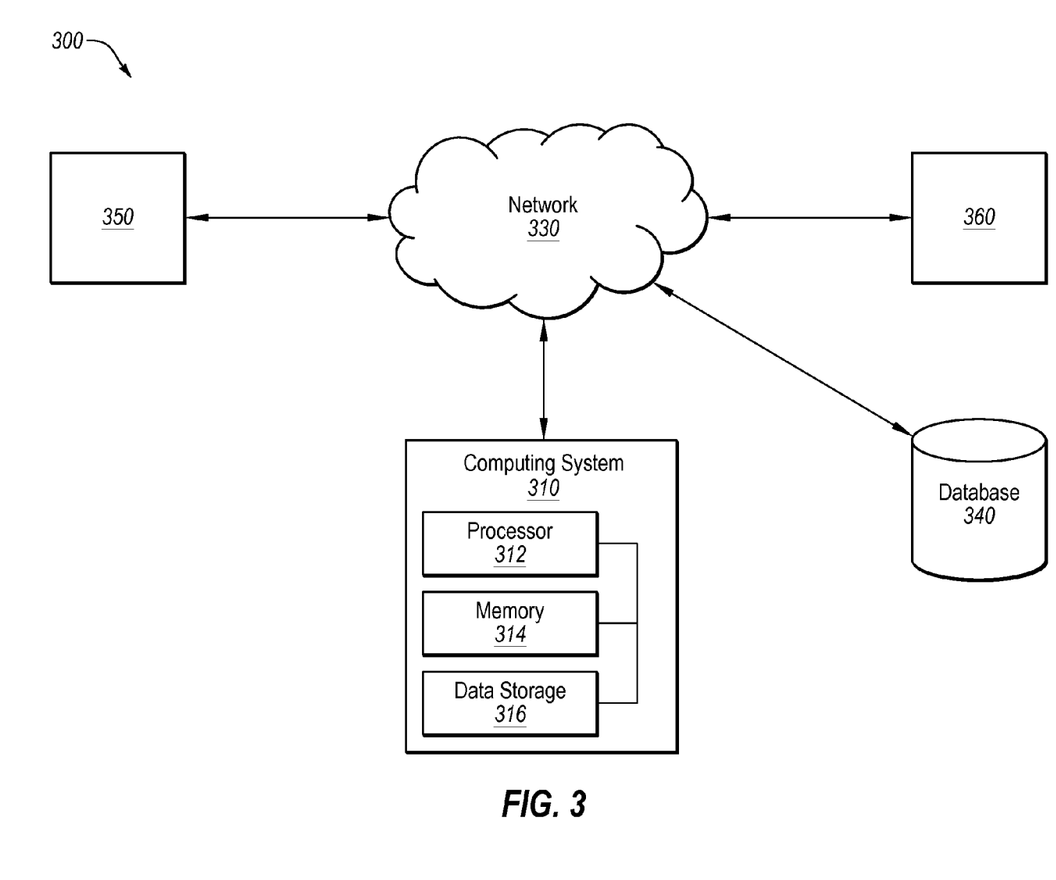
FIG. 3 illustrates an example system to determine merchandise information to send to a consumer.

FIG. 3 illustrates an example system 300 to determine merchandise information to send to a consumer. The system 300 may be arranged in accordance with at least one embodiment described herein. The system 300 may include a computing system 310, a network 330, a database 340, a communication interface 350, and a secondary system 360.

The computing system 310 may include a processor 312, a memory 314, and a data storage 316. The processor 312, the memory 314, and the data storage 316 may be communicatively coupled.

In general, the processor 312 may include any suitable special-purpose or general-purpose computer, computing entity, or processing device including various computer hardware or software modules and may be configured to execute instructions stored on any applicable computer-readable storage media. For example, the processor 312 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, it is understood that the processor 312 may include any number of processors configured to perform individually or collectively any number of operations described herein. Additionally, one or more of the processors may be present on one or more different electronic devices, such as different servers. In some embodiments, the processor 312 may interpret and/or execute program instructions and/or process data stored in the memory 314, the data storage 316, or the memory 314 and the data storage 316. In some embodiments, the processor 312 may fetch program instructions from the data storage 316 and load the program instructions in the memory 314. After the program instructions are loaded into memory 314, the processor 312 may execute the program instructions.

The memory 314 and the data storage 316 may include computer-readable storage media for carrying or having computer-executable instructions or data structures stored thereon. Such computer-readable storage media may be any available media that may be accessed by a general-purpose or special-purpose computer, such as the processor 312. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 312 to perform a certain operation or group of operations.

In general, the computing system 310 may be configured to receive information from the database 340, the communication interface 350, and the secondary system 360 over the network 330. Based on the received information, the computing system 310 may determine the type of merchandise. Alternately or additionally, the computing system 310 may determine information that may be presented to a consumer about the merchandise. For example, the computing system 310 may determine information that may be presented on a display coupled to a shelf, such as the displays 130 and 220 of FIGS. 1 and 2.

The network 330 may be any network or configuration of networks configured to send and receive communications between devices. In some embodiments, the network 330 may include a conventional type network, a wired or wireless network, and may have numerous different configurations. Furthermore, the network 330 may include a local area network (LAN), a wide area network (WAN) (e.g., the Internet), or other interconnected data paths across which multiple devices and/or entities may communicate. In some implementations, the network 330 may include a peer-to-peer network. The network 330 may also be coupled to or may include portions of a telecommunications network for sending data in a variety of different communication protocols. In some implementations, the network 330 includes Bluetooth® communication networks or a cellular communications network for sending and receiving communications and/or data including via short message service (SMS), multimedia messaging service (MMS), hypertext transfer protocol (HTTP), direct data connection, wireless application protocol (WAP), e-mail, etc. The network 330 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 330 may include one or more IEEE 802.11 wireless networks.

The database 340 may include data storage of consumer information. For example, the database 340 may include consumer information that is stored based on a consumer's name, random ID, private ID, account number, or some other identifying number. The consumer information may include previous purchases by the consumer, health conditions of the consumer, internet traffic of the consumer, goals of the consumer, travel plans of the consumer, a calendar of the consumer, current planned purchases of the consumer, among other information about the consumer. The database 340 may be configured to receive requests from the computing system 310 over the network 330 for consumer information and to provide the consumer information over the network 330 to the computing system 310.

The communication interface 350 may be analogous to the communication interface 160 and/or to the communication interface 260 of FIGS. 1 and 2 and may communicate information between a display, an electromagnetic field reader, and a weight measurement device and the computing system 310 by way of the network 330. For example, the communication interface 350 may be configured to communicate information to the computing system 310 from the electromagnetic field reader, and the weight measurement device, such as the identifier data of merchandise on a shelf and the weight supported by the shelf Alternately or additionally, the communication interface 350 may be configured to communicate information about merchandise from the computing system 310 to the display for presenting the information to a consumer.

The secondary system 360 may include any system and/or database that includes consumer information or merchandise information that may be shared with the computing system 310 to determine information about the merchandise to be presented to a consumer at a shelf that supports the merchandise.

Various examples of the type of consumer and merchandise information that may be used by the computing system 310 to determine information about the merchandise to be presented to a consumer at a shelf that supports the merchandise follows.

As an example, assume that merchandise is food and that the computing system 310 obtains consumer information that the consumer is allergic to gluten products. The computing system 310 may determine information about the merchandise to present to the consumer that includes a price of the merchandise and/or whether the merchandise includes gluten. As another example, the computing system 310 may receive consumer information that the consumer is on a diet. The computing system 310 may determine information about the merchandise to present to the consumer that includes a price of the merchandise and/or the calorie count of the merchandise. As another example, the computing system 310 may obtain consumer information that the consumer had recently tagged, downloaded, or printed a recipe and/or information about merchandise recently purchased by the consumer. The computing system 310 may determine an ingredient that is in a recipe that the consumer had not recently purchased. The computing system 310 may determine information about the merchandise to present to the consumer that includes a price of the merchandise and/or that the merchandise may be used in the recipe.

As another example, assume that the merchandise is a consumer product, such as toothpaste of brand X and that the computing system 310 obtains information about recent purchases of the consumer of toothpaste of brand Y. The computing system 310 may also obtain information about a rebate for consumers from the manufacturer of brand X for consumers that have previously purchased brand Y. The computing system 310 may determine information about the merchandise to present to the consumer that includes a price of the merchandise that is reduced for the consumer based on the manufacture's rebate.

As another example, assume that the merchandise is a food product and that the computing system 310 obtains information about a calendar of the consumer, which includes a note that the consumer needs to bring a dessert to a party. The computing system 310 may determine information about the merchandise to present to the consumer that includes a price of the merchandise and/or a suggestion that the food product would be good for the dessert to take to the party.

As another example, assume that the merchandise is a shirt and that the computing system 310 obtains information of other clothing recently purchased by the consumer or that the consumer has removed from a shelf and thus may plan to purchase. The computing system 310 may determine information about the merchandise to present to the consumer that includes a price of the merchandise and/or a suggestion that the shirt would match or be fashionable with the previous purchased clothing or clothing the consumer plans to purchase.

As another example, assume that the computing system 310 obtains information that the consumer has generally only purchased a certain type of merchandise when the merchandise is on sale. The computing system 310 may determine information about the merchandise to present to the consumer that includes a price of the merchandise that is reduced for the consumer to entice the consumer to purchase the merchandise.

As another example, assume that the computing system 310 obtains information about prices of the merchandise from an on-line or other competing retailer where the consumer has recently shopped. The computing system 310 may determine information about the merchandise to present to the consumer that includes a price of the merchandise that matches or is below the price of the merchandise at the on-line or other competing retailers where the consumer has recently shopped. The information may also indicate to the consumer that the price is price matched with the competing retailer.

As another example, the computing system 310 may determine a price of merchandise based on general consumer behavior with respect to the merchandise. For example, the computing system 310 may increase the price of merchandise during a time of higher demand for the merchandise. As another example, the computing system 310 may determine a price of merchandise based on general consumer behavior at a location that is selling the merchandise. For example, consumers may frequent a location, such as a store, more during weekends than weekdays or more during the evening than afternoon. In these and other embodiments, the computing system 310 may determine a price that is dynamic based on the time of day and the day of the week. For example, the computing system 310 may raise the price of merchandise when consumers more generally frequent the store and reduce the price of the merchandise when consumers less generally frequent the store.

As another example, the computing system 310 may determine a price of the merchandise based on a location of the shelf that supports the merchandise. For example, the computing system 310 may generally reduce the price of merchandise when the merchandise is located on lower shelves below the eye level of an average adult. In these and other embodiments, the computing system 310 may generally increase the price of merchandise when the merchandise is located on an eye level of an average adult. As another example, the computing system 310 may generally increase the price of merchandise when the merchandise is on a shelf on an end of a row of shelves.

In view of this disclosure, it will be appreciated that modifications, additions, or omissions may be made to the system 300 without departing from the scope of the present disclosure. For example, in some embodiments, the computing system 310 may determine the type of the merchandise based on the received weight and identifier data and a price of the merchandise. In these and other embodiments, the computing system 310 may send the type of the merchandise and/or the price of the merchandise to the secondary system 360. The secondary system 360 may access consumer information and based on the consumer information and the type of the merchandise determine the information about the merchandise to be presented to a consumer.

Figure 4:
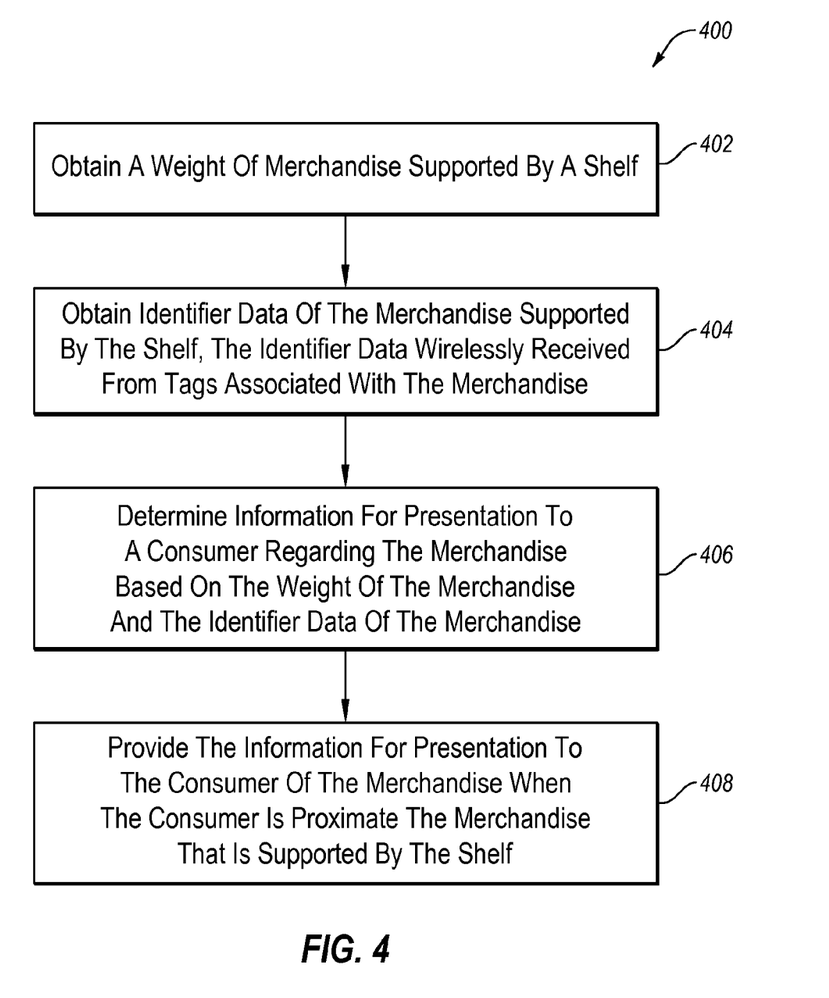
FIG. 4 is a flowchart of an example method to provide merchandise information to a consumer.

FIG. 4 is a flowchart of an example method 400 to provide merchandise information to a consumer. The method 400 may be arranged in accordance with at least one embodiment described herein. The method 400 may be implemented, in some embodiments, by a system, such as the system 100, 200, or 300 of FIGS. 1, 2, and 3, respectively. Although illustrated as discrete blocks, various blocks may be divided into additional blocks, combined into fewer blocks, or eliminated, depending on the desired implementation.

The method 400 may begin at block 402, where a weight of merchandise supported by a shelf may be obtained. In block 404, identifier data of the merchandise supported by the shelf may be obtained. In some embodiments, the identifier data may be wirelessly received from tags associated with the merchandise.

In block 406, information for presentation to a consumer regarding the merchandise may be determined based on the weight of the merchandise and the identifier data of the merchandise. In some embodiments, determining the information for presentation to the consumer regarding the merchandise may be based on correlating a change in weight of the merchandise supported by the shelf and the identifier data of the merchandise.

In some embodiments, the information presented to the consumer may include a price of one piece of the merchandise. In these and other embodiments, the price of the merchandise may be determined based on one or more of: a location of the shelf, a time of day, a day of the week, a manufacturer's coupon or rebate for the merchandise, how many pieces of the merchandise are supported by the shelf, and a competing price of the merchandise at a different location.

In block 408, the information may be provided for presentation to the consumer of the merchandise when the consumer is proximate the merchandise that is supported by the shelf.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 400 may further include determining whether the consumer is in proximity of the shelf based on wireless signals from a wireless device associated with the consumer. The method 400 may further include obtaining consumer information about the consumer. In these and other embodiments, based on a result of the determination of whether the consumer is in proximity of the shelf, the information provided to the consumer regarding the merchandise may be further based on the consumer information.

Figure 5:
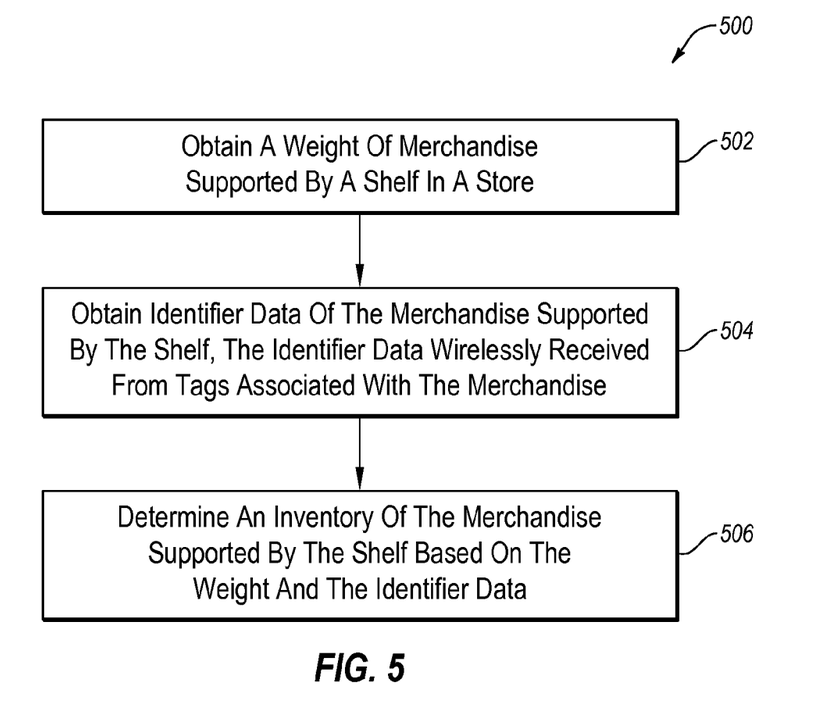
FIG. 5 is a flowchart of another example method to provide merchandise information to a consumer.

FIG. 5 is a flowchart of another example method 500 to provide merchandise information to a consumer. The method 500 may be arranged in accordance with at least one embodiment described herein. The method 500 may be implemented, in some embodiments, by a system, such as the system 100, 200, or 300 of FIGS. 1, 2, and 3, respectively. Although illustrated as discrete blocks, various blocks may be divided into additional blocks, combined into fewer blocks, or eliminated, depending on the desired implementation.

The method 500 may begin at block 502, where a weight of merchandise supported by a shelf in a store may be obtained. In block 504, identifier data of the merchandise supported by the shelf may be obtained. In some embodiments, the identifier data may be wirelessly received from tags associated with the merchandise.

In block 506, an inventory of the merchandise supported by the shelf may be determined based on the weight and the identifier data.

In some embodiments, the method 500 may further include determining a price of the merchandise based on the inventory of the merchandise. In some embodiments, the method 500 may further include detecting a removal of a piece of the merchandise from the shelf and a replacement of the piece of the merchandise to the shelf based on the weight and the identifier data. In these and other embodiments, the price may be determined based on the piece of the merchandise being removed and replaced.

In some embodiments, the method 500 may further include providing the price of the merchandise for presentation of the price to a consumer proximate to the shelf.

As indicated above, the embodiments described herein may include the use of a special purpose or general purpose computer (e.g., the processor 312 of FIG. 3) including various computer hardware or software modules, as discussed in greater detail below. Further, as indicated above, embodiments described herein may be implemented using computer-readable media (e.g., the memory 314 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the system and methods described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system, comprising:
   a shelf configured to support merchandise;
   a weight measurement device coupled to the shelf, the weight measurement device configured to measure a weight of the merchandise supported by the shelf;
   an electromagnetic field reader coupled to the shelf, the electromagnetic field reader configured to wirelessly receive identifier data of the merchandise supported by the shelf from tags coupled to the merchandise;
   a display configured to present information to a consumer regarding the merchandise; and
   a computing system communicatively coupled to the display, the weight measurement device, and the electromagnetic field reader, the computing system configured to:
      determine a change in the weight of the merchandise supported by the shelf;
      obtain identifier data of one or more pieces of the merchandise supported by the shelf;
      obtain a weight of the one or more pieces of the merchandise on the shelf based on the identifier data;
      compare the weight of the one or more pieces of the merchandise with the change in the weight of the merchandise supported by the shelf;
      verify the identifier data obtained for the one or more pieces of the merchandise based on the comparison of the weight of the one or more pieces of the merchandise with the change in the weight of the merchandise; and
      determine the information to be presented to the consumer based on the verified identifier data.

2. The system of claim 1, wherein the information includes a price of the merchandise.

3. The system of claim 2, wherein the computing system determines the price of the merchandise based on two or more of: a location of the shelf, a time of day, a day of the week, a manufacturer's coupon or rebate for the merchandise, how many pieces of the merchandise are supported by the shelf, and a competing price of the merchandise at a different location.

4. The system of claim 1, further comprising a wireless network communicatively coupled to the computing system, the wireless network configured to receive signals from a wireless device associated with the consumer, wherein the computing system is further configured to determine a location of the consumer based on the signals from the wireless device and to obtain an identity of the consumer based on the signals from the wireless device.

5. The system of claim 4, wherein in response to the computing system determining that the consumer is in proximity of the shelf based on the location of the consumer, the computing system is configured to determine the information provided to the consumer regarding the merchandise based on consumer information obtained by the computing system that is based on the identity of the consumer.

6. The system of claim 5, wherein the consumer information includes previous purchases by the consumer, health conditions of the consumer, internet traffic of the consumer, and current planned purchases of the consumer.

7. The system of claim 5, wherein the information presented to the consumer includes a price of one piece of the merchandise and details regarding the merchandise.

8. A method, comprising:
obtaining, by a weight measurement device coupled to a shelf, a first weight of merchandise supported by the shelf;
obtaining, by an electromagnetic field reader coupled to the shelf, identifier data of the merchandise supported by the shelf, the identifier data wirelessly received from one or more tags associated with the merchandise;
obtaining, by the weight measurement device, a second weight of merchandise supported by the shelf;
determining, by a computing system coupled to the weight measurement device and the electromagnetic field reader, a change of merchandise weight based on the first weight and the second weight;
obtaining, by the computing system, a weight associated with the merchandise based on the identifier data;
comparing, by the computing system, the obtained weight with the change of merchandise weight;
verifying, by the computing system, the identifier data obtained of the merchandise based on the comparison of the obtained weight with the change of merchandise weight;
determining, by the computing system, information for presentation to a consumer regarding the merchandise based on the verified identifier data; and
providing, by a display coupled to the computing system, the information for presentation to the consumer of the merchandise when the consumer is proximate the merchandise that is supported by the shelf.

9. The method of claim 8, wherein the information includes a price of the merchandise.

10. The method of claim 9, wherein the price of the merchandise is determined based on one or more of: a location of the shelf, a time of day, a day of the week, a manufacturer's coupon or rebate for the merchandise, how many pieces of the merchandise are supported by the shelf, and a competing price of the merchandise at a different location.

11. The method of claim 8, further comprising:
determining whether the consumer is in proximity of the shelf based on wireless signals from a wireless device associated with the consumer; and
obtaining consumer information about the consumer.

12. The method of claim 11, wherein based on a result of the determining whether the consumer is in proximity of the shelf, the information provided to the consumer regarding the merchandise is further based on the consumer information.

13. A method, comprising:
obtaining, by a weight measurement device coupled to a shelf, a first weight of merchandise supported by the shelf in a store at a first time;
obtaining, by the weight measurement device, a second weight of merchandise supported by the shelf in the store at a second time;
obtaining, by an electromagnetic field reader coupled to the shelf, identifier data of the merchandise supported by the shelf, the identifier data wirelessly received from tags associated with the merchandise;
determining, by a computing system coupled to a display, the weight measurement device, and the electromagnetic field reader, interest of a consumer in the merchandise based on a difference between the first weight and the second weight and a difference between the first time and the second time; and
determining, by the computing system, information for presentation to the consumer by the display regarding the merchandise based on the identifier data and the determined interest of the consumer.

14. The method of claim 13, wherein the information includes a price of the merchandise.

15. The method of claim 13, further comprising providing the information of the merchandise for presentation to the consumer.

16. The system of claim 1, wherein the information includes a price of the merchandise and the computing system is further configured to:
determine an inventory of the merchandise on the shelf based on the weight of the merchandise on the shelf; and
adjust the price based on the inventory.

17. The system of claim 1, wherein the information includes a price of the merchandise and the computing system is configured to determine the price of the merchandise based on one or more of: a location of the shelf and a competing price of the merchandise at a different location.

18. The system of claim 1, wherein the information includes a price of the merchandise and the computing system is configured to determine the price of the merchandise based on one or more of: a time of day and a day of the week.

19. The method of claim 13, wherein the computing system determines that the consumer removed a first piece of the merchandise from the shelf and then replaced the first piece of the merchandise to the shelf based on the difference between the first weight and the second weight and the difference between the first time and the second time and the interest of the consumer is determined based on the consumer removing and replacing the first piece of the merchandise from the shelf.

* * * * *